(12) United States Patent
Hagemann et al.

(10) Patent No.: US 10,032,155 B2
(45) Date of Patent: Jul. 24, 2018

(54) ELECTRONIC TRANSACTION METHOD

(71) Applicants: Dirk Hagemann, Bonn (DE); Jochen Lampe, Hürtgenwald (DE)

(72) Inventors: Dirk Hagemann, Bonn (DE); Jochen Lampe, Hürtgenwald (DE)

(73) Assignee: DEUTSCHE POST AG (DE)

( * ) Notice: Subject to any disclaimer, the term of this patent is extended or adjusted under 35 U.S.C. 154(b) by 965 days.

(21) Appl. No.: 14/357,105

(22) PCT Filed: Nov. 14, 2012

(86) PCT No.: PCT/EP2012/072568
§ 371 (c)(1),
(2) Date: May 8, 2014

(87) PCT Pub. No.: WO2013/072341
PCT Pub. Date: May 23, 2013

(65) Prior Publication Data
US 2014/0316994 A1 Oct. 23, 2014

(30) Foreign Application Priority Data
Nov. 17, 2011 (EP) .................................... 11189632

(51) Int. Cl.
*G06Q 20/32* (2012.01)
*G06F 21/36* (2013.01)
(Continued)

(52) U.S. Cl.
CPC ........... *G06Q 20/322* (2013.01); *G06F 21/36* (2013.01); *G06Q 20/32* (2013.01); *G06Q 20/382* (2013.01); *G06Q 20/385* (2013.01); *G06Q 20/40* (2013.01)

(58) Field of Classification Search
CPC .... G06Q 20/322; G06Q 20/382; G06Q 20/40; G06Q 20/385; G06Q 20/32; G06F 21/36
(Continued)

(56) References Cited

U.S. PATENT DOCUMENTS 5,926,806 A * 7/1999 Marshall ........... G06F 17/30572
707/752
6,856,975 B1 * 2/2005 Inglis ..................... G06Q 20/02
705/40
(Continued)

FOREIGN PATENT DOCUMENTS

DE 100 39 569 C1 12/2001
DE 10039569 C1 12/2001
(Continued)

OTHER PUBLICATIONS

WIPO Search Report for corresponding PCT/EP2012/072568.
(Continued)

*Primary Examiner* — Calvin L Hewitt, II
*Assistant Examiner* — Dennis G Keritsis
(74) *Attorney, Agent, or Firm* — Tarolli, Sundheim, Covell & Tummino LLP

(57) ABSTRACT

The invention relates to an electronic method for approving a transaction, to a corresponding transaction system, to a transaction application for carrying out the method, to a mobile terminal having such a transaction application, and to a payment system comprising the transaction system in order to execute the transaction. In this manner, an electronic method is made available that is easy to handle and that can be used to approve a transaction within the scope of a business transaction between buyers and sellers, that can be used virtually without limitations in terms of location, that requires a minimum of already available technical infrastructure, and that is nevertheless secure for all parties
(Continued)

involved. For this purpose, the mobile terminal has to have a display element, it has to be suitable to establish a wireless data connection with the transaction server, and it has to have application and e-mail capabilities.

5 Claims, 6 Drawing Sheets

(51) Int. Cl.
*G06Q 20/38* (2012.01)
*G06Q 20/40* (2012.01)

(58) Field of Classification Search
USPC .......................................................... 705/66
See application file for complete search history.

(56) References Cited

U.S. PATENT DOCUMENTS

| | | | | |
|---|---|---|---|---|
| 2003/0028481 | A1* | 2/2003 | Flitcroft | G06Q 20/00 705/39 |
| 2005/0248471 | A1* | 11/2005 | Ryu | G06K 7/1095 341/1 |
| 2007/0244831 | A1* | 10/2007 | Kuo | G06Q 20/02 705/67 |
| 2011/0191196 | A1* | 8/2011 | Orr | G06Q 20/204 705/17 |
| 2011/0251962 | A1* | 10/2011 | Hruska | G06Q 20/0457 705/72 |
| 2012/0290480 | A1* | 11/2012 | Chen | G06Q 20/02 705/44 |
| 2013/0282570 | A1* | 10/2013 | Charrat | G06Q 20/204 705/39 |

FOREIGN PATENT DOCUMENTS

| | | |
|---|---|---|
| WO | 2009/121437 A1 | 10/2009 |
| WO | WO 2009/121437 A1 | 10/2009 |
| WO | 2010/001423 A1 | 1/2010 |
| WO | WO 2010/001423 A1 | 1/2010 |

OTHER PUBLICATIONS

Australian Examination Report for Application No. 2012338907 dated Apr. 20, 2017.
International Search Report for corresponding PCT/EP2012/072568 completed Nov. 23, 2012 by Thomas Spitaler of the EPO.
Translation of DE100 39 569 C1 obtained from http://worldwide.espacenet.com/publicationDetails/biblio?DB=EPODOC&II=0 &ND=3&adjacent=true&locale=en EP&FT-=D&date=20011206 &CC=DE&NR=10039569C1&KC=C1.
Translation of WO 2009/121437 A1 obtained from http://worldwide.espacenet.com/publicationDetails/biblio?CC=WO &NR=2009121437A1&KC=A1&FT=D&ND=3&date=20091008 &DB=EPODOC&locale=en EP.

* cited by examiner

ELECTRONIC TRANSACTION METHOD

RELATED APPLICATIONS

The present invention claims priority from International Patent Application No. PCT/EP2012/072568, filed 14 Nov. 2012, which claims priority from European Patent Application No. 11189632.0, filed 17 Nov. 2011, both of which are incorporated herein by reference in their entirety.

FIELD OF THE INVENTION

The invention relates to an electronic method for approving a transaction, to a corresponding transaction system, to a transaction application for carrying out the method, to a mobile terminal having such a transaction application, and to a payment system comprising the transaction system.

BACKGROUND OF THE INVENTION

Electronic methods that support business transactions, especially the payment of goods, are already being used worldwide. Such electronic methods permit, for example, cashless payments in a store using a payment card such as an EC debit card or a credit card. In order for such a payment by EC debit card or credit card to be possible, the store in question has to have an electronic card reader with which the payment card can be swiped and which is connected via a data line to a payment system, for example, of the company that issued the card, so that the payment can be transacted from the store. In order for such cashless payments to be possible, the stores in question have to make the requisite technical infrastructure available, that is to say, a data line that connects at least to the card company, and one or more appropriate card readers. In particular, small stores such as newsstands or else remotely located stores or mobile businesses are often not capable of providing the necessary technical infrastructure for such an electronic method. However, even if these businesses were to have the technical infrastructure, they would have to incur additional costs for this, which can be quite difficult, particularly for small businesses or for businesses with a low sales volume. Therefore, a system or method would be desirable that, with a minimal technical infrastructure, can support business transactions specifically for small or mobile businesses. It would also be desirable if, in addition, this system or method were inexpensive to operate.

SUMMARY OF THE INVENTION

An objective of the present invention is to provide an electronic method that is easy to handle and that can be used to approve a transaction within the scope of a business transaction between buyers and sellers, that can be used virtually without limitations in terms of location, that requires a minimum of already available technical infrastructure, and that is nevertheless secure for all parties involved.

This objective is achieved by an electronic method to approve a transaction within the scope of a business transaction between at least a first person and a second person via a mobile terminal belonging to the second person and having a display element that is connected to a transaction server of a transaction system via a wireless data connection for purposes of exchanging data for approving the transaction, comprising the following steps:

installation of a transaction application on the mobile terminal, preferably the transaction application is transmitted by the transaction system to the mobile terminal, provision of at least first user data of the first person as well as second user data of the second person in the transaction system for purposes of access by the transaction server, transmission of a plurality of transaction encodings to the first person by the transaction system, whereby each transaction encoding encompasses a personal identification of the first person, a first transaction code, preferably a graphic first transaction code, as well as a second transaction code, preferably a graphic second transaction code, whereby each of the transmitted transaction encodings differs unambiguously from the other transmitted transaction encodings, at least in terms of having different first and/or second transaction codes, storage of the transmitted transaction encodings in the transaction system and association with the first user data of the first person, execution of the transaction application on the mobile terminal of the second person so as to connect the mobile terminal to the transaction server and at least to control the approval of the transaction in order to complete the business transaction with the first person, comprising the following steps:

a) the first person is selected by the second person via the mobile terminal, preferably on the basis of data that is transmitted by the transaction server to the mobile terminal, b) at least a first part (7-1a) of a first transaction encoding is transmitted by the transaction server to the mobile terminal of the second person, c) the transmitted (U4) first part (7-1a) of the first transaction encoding is supplemented with a supplement and with the involvement of the first person, d) the supplement is transmitted to the transaction server, the first part (7-1a) of the first transaction encoding transmitted by the transaction server is linked to the supplement in order to form a supplemented transaction encoding, and then the supplemented transaction encoding is compared to the stored first transaction encoding that is associated with the user data of the first person, and the transaction is approved by the transaction server after it has been ascertained that the supplemented first transaction encoding and the stored first transaction encoding for this transaction are identical, and then an approval confirmation is transmitted to the mobile terminal or the approval is refused if they are found not to be identical, and then the refusal is transmitted to the mobile terminal.

As a result, an electronic method that is easy to handle and that can be used to approve a transaction within the scope of a business transaction between business parties (first person and second person) is put forward that can be used virtually without limitations in terms of location (wireless connection between the transaction server and the mobile terminal), that requires a minimum of already available technical infrastructure (mobile terminal of the second person), and that is nevertheless secure (use of transaction encodings with subsequent comparison and approval after verification by the transaction server) for all business parties involved (first person and second person). The term "mobile terminal" as used here encompasses all devices that have a display element, that are capable of maintaining a wireless data connection with the transaction server, and that have application and e-mail capabilities such as, for example, smartphones. The wireless data connection can be established, for example, via a mobile telecommunications network or a WLAN network. The method can be carried out for any desired number of first and second persons.

A transaction as set forth in the present invention is, for instance, the payment of the purchase price within the scope of a business transaction between the first person and the second person. Here, for example, the first person is the seller of a product and the second person is the buyer of this product. With the above-mentioned method, for instance, the buyer can effectuate the payment of the purchase price to the seller via the approval of this transaction (here the payment). For this purpose, for example, the bank data of the first and second persons constitutes part of the first and second user data. However, the bank data of the second person would not be necessary if, within the scope of the transaction, the second person can make use of a credit in another form, for example, in that a monetary amount that is sufficient for the transaction is previously deposited into a credit account in a system that is involved in the transaction. Following the approval, the payment of the purchase price can be made to the seller (first person). The transaction, here, for example, the payment, is authorized through the use of unambiguous and characteristic transaction encodings. The transaction is securely authorized for both parties via the selection procedure of the seller (first person), followed by the transmission of a first part of the transaction encoding from the transaction system to the buyer (second person) on the mobile terminal of the latter, and through the supplementation of the first transaction encoding that is valid for this transaction, which is only known in its entirety to the seller (first person), with the involvement of the seller via his or her mobile terminal with subsequent verification by the transaction system. Fraudulent use of the data exchange can be ruled out by comparing the first transaction encoding, which is stored in the transaction system, to the supplemented transaction encoding (transmitted first part of the first transaction encoding+the supplement to this transmitted first part). For example, if a supplement is selected in the mobile terminal and if, after being linked to the transmitted first part of the transaction encoding, this supplement yields a transaction encoding that does not match the first transaction encoding that the seller has, then, instead of a confirmation of the approval, a refusal is sent to the mobile terminal so that the seller can see that the transaction has not been approved and thus, for example, if the transaction entails an instruction to pay, this will not be carried out. In this manner, the seller can, for example, refuse to give the product to the buyer until the latter has made a valid payment. However, if the buyer (second person) shows to the seller (first person) the confirmation of the approval on his or her mobile terminal, then the product can be handed over to the buyer. Thus, by using the electronic method according to the invention, the business transaction is carried out securely for both parties. By using a single mobile terminal that in and of itself is already sufficient for securely carrying out the method at the business premises, in principle, the use of the method has no limitations in terms of location, as long as there is a wireless connection between the mobile terminal and the transaction server. This wireless connection is largely available on land and, if applicable, also in areas on the seas and in the air. In order for the transaction to be approved, user data pertaining to all of the participating users, in other words, at least first and second user data pertaining to a first person and to a second person, has to be stored in the transaction system. On the basis of this data, the transaction encodings are transmitted to the first person, wireless data connections are established in order to transmit data such as personal identifications as well as first and second transaction codes, and a selection of first persons is made possible via the mobile terminal. This user data is stored, for example, in the transaction system in a user database which is connected to the transaction server and which the transaction server can access in order to carry out the method steps. The user data of the users of the transaction system, that is to say, the first and second persons, can be entered into the transaction system in different ways. In one embodiment, the method comprises the additional step of registration of at least the first and second persons in the transaction system in order to generate first and second user data. Here, the number of first and second persons is not limited. The expressions "first person" and "second person" as set forth in the invention refer only to the role assignment during the execution of the method steps and these terms do not constitute a numerical limitation of the number of users. Here, for example, the first and second user data can be entered by reading in user data sheets or by entering user data on the basis of data provided by the users (first and second persons) at the time when a user registers in the transaction system.

In a preferred embodiment, the registration of at least the first person is carried out via a website of the transaction system, whereby at least the first person provides data. For this purpose, for example, a first person activates an Internet-capable terminal device such as, for example, a laptop, a PC, a notebook or a smartphone, and opens the address of the website of the transaction system in a browser, so that, by clicking on an appropriate field, the registration process for the transaction system is started. Within the scope of the present invention, the person skilled in the art is capable of providing a suitable registration process for the transaction system on a website. As a network having one or more transaction servers with an Internet connection, the transaction system can also comprise, for instance, one or more computers that provide the website (in a web portal) and that are connected to the transaction server(s) and, if applicable, to the additional components of the transaction system. In a client-server network, the transaction servers are the servers (backend), whereas the computers by means of which the first and/or second persons use the website of the transaction system are the clients (frontend). Whenever the term "transaction server" is used within the scope of this invention, this always includes the possibility of using several transaction servers.

In one embodiment, a three-stage registration process is performed, whereby in a first step, personal data of the first person is entered such as, for example, the name of the person and/or the name of a company, the associated address, if applicable, additional data such as the contact person at the company, the business sector of the first person (e.g. flower store, bakery shop, newsstand, etc.), a marking of the position of the first person or company on a virtual map (e.g. via a Google Maps application incorporated into the website), and this data is confirmed at the end of the entering procedure. In one embodiment, when the business sector is entered, the website shows to the first person graphic symbols that the first person can select in order to indicate his or her business sector. In this embodiment, the selected symbol can be stored or used in order to generate a personal identification or else as the personal identification of the first person for the transaction encodings that are to be generated later on, for example, in a generating means for generating transaction encodings or in a memory to which the generating means has access. In this embodiment, the personal identification of the first person is a graphic personal identification of the first persons can also be stored in the first user data in a user database that the generating means accesses in order to generate the transaction encodings. In another embodiment, the first person can also use the website to upload his or her own graphic symbol (e.g. a company logo) into the transaction system as his or her desired personal identification. The storage and access to the personal identification can then be configured as described above. Each first person has an unambiguous personal identification that differs from every other personal identification of other first persons.

As the second step of the registration, transaction-relevant data of the first person can be entered into the transaction system via the web site. For example, if the transaction involves the payment of a purchase price, account data such as the name of the account holder, the name of the bank where the account is held, the account number and the bank routing number are all entered. In order to complete the second step, the entered data is confirmed by the first person by clicking on the appropriate field on the website, and then this data is transmitted to the databases, to the memory locations and/or to the transaction server. In one embodiment, a plausibility verification is carried out when the transaction-relevant data is entered in order to prevent that a transaction that is subsequently approved cannot be executed because of erroneous user data.

As the third step, in one embodiment, a user name can be issued with an associated access authorization (account). The user name and the access authorization (e.g. password) are stored in the user data and transmitted to the transaction server.

After the registration process (registration) has been completed, the first person can generate a plurality of transaction encodings from his or her thus-activated account by clicking on an appropriate field on the website. As an alternative, in one embodiment, the transaction system automatically generates the plurality of transaction encodings for the registered first person for transmission to the first person after the registration has been completed. This plurality of transaction encodings can be configured in the form of an electronic list, for example, as an electronic list in a pdf format, Word format or Excel format, whereby the individual transaction encodings each contain a personal identification of the first person, a first transaction code and a second transaction code, whereby each of the transaction encodings in this generated list differs unambiguously from the other transmitted transaction encodings, at least in terms of having different first and/or second transaction codes. Within the scope of the present invention, the person skilled in the art can select a suitable format for the first and second transaction codes. In one embodiment, first and second transaction codes are graphic codes such as, for example, graphic symbols. Such graphic codes (symbols) are easy to recognize and to communicate, which translates into a reduced error rate during the transmission of the transaction encodings and the subsequent approval of the transaction (or its refusal). However, it is also possible to issue graphic-acoustic codes (symbols) that improve the recognition rate and reduce the error rate. The list of transaction encodings can be configured in different ways within the scope of the present invention. The generated transaction encodings can be generated, for example, as a list with lines, columns, and a shared general header, whereby, for instance, the personal identification is displayed in the shared header. In order to carry out the further method steps, after the first person has been selected, he or she is designated and, for example, several transactions can be carried out consecutively with this person, as a result of which such a list of transaction encodings only requires a one-time indication of the personal identification in the header. The header can be divided into several sections containing additional information such as, for example, personal data, etc. Moreover, in a first column, the list of transaction encodings can contain numbering for the further combinations of first and second transaction codes according to the first, second, third, . . . transaction encoding, whereas the corresponding first and second transaction codes are indicated in the second and third columns. Preferably, the first and second transaction codes are graphic symbols that permit a secure use of this list in printed-out form by the first person, even from a certain distance. For example, the list with the transaction codes is displayed behind a store counter and the information of the graphic first and second transaction codes on the list is securely compared to the information of the mobile terminal from a certain distance in order to carry out the further method steps, which, in the case of a purely alphanumeric encoding, would lead to a high error rate during the data entry (supplementation) in the mobile terminal. The use of graphic symbols as the first and second transaction codes (graphic transaction codes) accounts for a reduced error rate during the data entry within the scope of the method according to the invention and thus to a faster approval of the transaction by the transaction system. In one embodiment, the list with the plurality of transaction encodings has at least one additional column designed, for example, for entering monetary amounts for transactions that constitute payments. This list of transaction encodings can comprise a different number of transaction encodings, for example, 20 or 100 different transaction encodings. Depending on the embodiment, the number of transaction encodings can be predetermined by the transaction system or else it can be selected by the first person, for example, by means of an appropriate selection field on the website, in such a way that it meets the requirements of the first person.

As an alternative, the plurality of transaction encodings of the first person can be made available as a printable list. The printing procedure can be carried out or initiated, for example, via the website by clicking an appropriate printing field. In one embodiment, the plurality of transaction encodings is transmitted by the transaction system to the first person in that the transaction encodings are printed out on a printer of the first person. In an alternative or supplementary embodiment, the transaction encodings and, if applicable, additional communication to be carried out between the transaction system and the first person, can be transmitted via a smartphone of the first person. For this purpose, an appropriate first-person application that permits a transmission is installed on the smartphone of the first person. This first-person application can be made available to the first person, for example, via an application memory.

The one-time registration of the second person can likewise be carried out via the website of the transaction system in that the second person provides data. For example, in order to do so, the second person activates an Internet-capable terminal device such as, for example, a laptop, a PC, a notebook or a smartphone, and opens the address of the website of the transaction system in a browser, so that the registration process for the transaction system can be started by clicking on an appropriate field. The person skilled in the art is capable of providing a suitable registration process for the transaction system on a website within the scope of the present invention.

In an alternative embodiment, the transaction application is transmitted to the mobile terminal of the second person by downloading the transaction application, for example, via a direct link of the mobile terminal with the browser of the website of the transaction system, or from a website that offers applications for downloading (e.g. a so-called app store). The second person installs the transaction application on the mobile terminal, for instance, after downloading it. In a preferred embodiment, the transaction application automatically installs itself on the mobile terminal after it has been downloaded onto the mobile terminal. This automatic installation can also take place if, as an alternative, the transaction application was uploaded onto the mobile terminal, for example, from a memory chip or a CD-ROM. In order to download the transaction application, it is not absolutely necessary for the second person to have previously registered with the transaction system.

In one embodiment, a first boot of the transaction application installed on the mobile terminal automatically starts the step of registration of the second person once a wireless data connection to the transaction server has been established. In a preferred embodiment, contact data for establishing the wireless data connection is automatically transmitted by the transaction application to the transaction server. This registration of the second person can consist of a multi-stage registration process. The transaction application first downloads a registration form from the transaction server. The second person (e.g. the later buyer of a product in a store) enters his or her name, e-mail address, etc. into the electronic form. The provision of a regular mailing address might be necessary, depending on the payment method, for instance, in case of an electronic direct debit procedure. In order to carry out the method, the second person has to have a valid e-mail address to which the further transmissions can be sent later on by the transaction server. This information serves to identify the second person in the transaction system. Moreover, the second person can generate an access authorization, for example, a four-digit security PIN, whereby, in order to carry out the method according to the invention, the transaction application on the mobile terminal of the second person can only be started after the correct PIN has been entered. Then, in order to complete the first step, the entered data is confirmed by the second person by clicking on an appropriate field on the electronic form. In the next step, the second person can enter his or her transaction-relevant data into the electronic form. For example, for the payment of a purchase price as the transaction that is to be approved, the account data is entered such as, for example, the name of the account holder, the name of the bank where the account is held, the account number and the bank routing number. The present invention can also be used for alternative payment systems. For example, with Giropay, funds can be added in order to use the method according to the invention. In order for payment transaction to be completed, the necessary data for logging in to the mobile bank account of the first person would have to be entered, along with a secret user name and a PIN. For the desired use of the electronic direct debit procedures, additional identification measures for the second person might be necessary, which is why, in this step, additional data would have to be entered for the second user data. In each case, the payment is made after approval by the transaction system. In order to complete the second step, the entered data is confirmed by the second person by clicking on an appropriate field on the electronic form. In one embodiment, a plausibility verification is carried out when the transaction-relevant data is entered in order to prevent that the transaction that is subsequently approved cannot be executed because of erroneous user data. The entered data is transmitted to the transaction server either step by step or all at once.

In order to complete the registration, the second person receives an e-mail from the transaction server containing a secure confirmation link, which the second person follows. Via this link, the second person reaches a secure page generated only for that individual second person (subsequent other second persons receive an appropriate link to a different page). The transaction system identifies the second person and associates the e-mail address with the second user data. The transaction system now has the complete second user data of the second person. The registration process is hereby completed. From this point on, the transaction application can be used to carry out the method according to the invention.

In one embodiment, the step of selecting the first person is carried out via the mobile terminal on the basis of data that is transmitted by the transaction server to the mobile terminal. The data pertaining to the first persons is displayed in a suitable form on the display element of the mobile terminal. This suitable form preferably comprises a symbol or logo that makes the business of the first person recognizable for the second person. In addition, depending on the embodiment and/or on the information requirements made by the second person, additional data pertaining to the first person can also be displayed immediately or it can be displayed subsequently by clicking on the symbol or logo. The data pertaining to the first persons is available in the user data of the first persons.

In one embodiment, the step of selecting the first person comprises the following steps: (i) the position of the mobile terminal is automatically located by the transaction system, (ii) data of all first persons who are present within a given area around the mobile terminal is transmitted, (iii) the data is displayed on the display element of the mobile terminal in a form that is suitable for selecting the first person, preferably in graphic form, (iv) the first person is selected by actuating a depiction on the display element that is associated with the first person. In order for this locating of the position to be carried out, in an additional registration step that is preferably performed at the time of the registration, the second person confirms his or her consent to having the position of his or her mobile terminal located, said location later corresponding to the position of the second person, provided that the second person has his or her mobile terminal on him. The consent by the second person to be located with a satellite-assisted positioning system, for example, GPS or Galileo, is stored in the transaction system as part of the second user data. As an alternative, the position could always be located via a manual input of the postal code and a subsequent selection list, or else by marking a position on a digital map displayed on the display element.

After the transaction application is started for an already registered second person, the momentary position of the mobile terminal is determined (positioning) and, based on the momentary position, the first persons who are in the area are indicated. The position of the first person (e.g. the location of the store that the first person operates and for which the method according to the invention is to be made available) is indicated to the transaction system by the first person as already described above during the registration of the first person, and said position is available to the transaction system via the first user data. The position of the second person is determined by means of a positioning and calculating means (e.g. a processor with location-detection and positioning software installed on it) that is connected to an appropriate positioning system, and this position is compared to the position of the first persons contained in the first user data. If first persons are within a predefined distance from the second person, then data pertaining to the first persons within this distance is transmitted to the mobile terminal and displayed in a suitable form on the display element of the mobile terminal. This suitable form preferably comprises a symbol or logo that designates the business premises of the first person so that it can be recognized by the second person. In addition, depending on the embodiment and/or the information required by the second person, additional data pertaining to the first person can also be displayed immediately or can be displayed subsequently by clicking on the symbol or logo. In the simplest embodiment, the distance within which the data of the first person present there is transmitted can define a circular area whose midpoint is the position of the second person. This reduces the computing work needed to select the first persons about whom data is then to be transmitted to the mobile terminal. In a preferred embodiment, the distance is a route that the second person has to travel along the available routes in order to reach the first person. Particularly in cities, it might not be possible to walk the shortest distance as the crow flies between two points, for instance, because lots or buildings might have no thoroughfares. In computing the required route between the positions of the second person and potential first persons (for example, along a sidewalk around a block of buildings into another street), the selection criterion "distance" is not the distance in a straight line, but rather a realistic route, which leads to greater user satisfaction on the part of the second person. In this manner, first persons can be offered who can indeed be reached within the determined distance. The value of the distance within which data about first persons is transmitted to the mobile terminal can be predefined, for example, in the transaction system, or it can be selected by the second person via an appropriate selection field in the electronic form used for the registration of the second person. This selection can be changed at any time by means of a new entry regarding the second user data. On the basis of the data displayed on the display element, the second person selects one of the first persons, for instance, by tapping with a finger on the symbol or logo of the first person on a touchscreen display element or by using a cursor. Here, it is advantageous if the symbol or logo corresponds to the applicable personal identification.

After a desired first person has been selected, for example, on the basis of the data transmitted by the transaction server regarding the potential first persons, the method to approve a transaction is continued. For this purpose, in one embodiment, the second person can enter, for example, the security PIN in order to activate the subsequent method steps. In order to do so, the second person (customer) selects an appropriate field from a menu of the transaction application, enters the security PIN and confirms the entry. This entry is then verified by the transaction server. In one embodiment, the second person subsequently makes additional entries pertaining to the transaction to be carried out, and these entries are made in appropriate fields offered by the transaction application on the display element such as, for example, the price to be paid for a product, whereby the entered price is confirmed by clicking on a confirmation field before the transmission to the transaction server. After the confirmation, the transaction application automatically transmits the transaction data (such as, for instance, the price to be paid) to the transaction server that then selects a transaction encoding from the plurality of transaction encodings transmitted to the first person and it then transmits this transaction encoding which has been selected in the transaction system and which will be referred to below as the first transaction encoding, or at least a first part of this first transaction encoding to the mobile terminal of the second person. The term "first transaction encoding" does not necessarily refer to the first transaction encoding or to the transaction encoding at the top of the list of transaction encodings that has not yet been used and that was transmitted to the first person by the transaction system, but rather, it merely refers to a specific transaction encoding from the plurality of transaction encodings. The first transaction encoding can also be selected, for instance, randomly by the transaction server from among the plurality of transaction encodings transmitted to the first selected person. This transmitted first part of the transaction encoding serves, on the one hand, to verify the first person. On the other hand, this transmitted first part serves to verify the transaction, insofar as the transmitted first part is supplemented in such a way that the linking consisting of the first part and the supplement corresponds to the transaction encoding (first transaction encoding) selected by the transaction system.

In one embodiment, the first part comprises the personal identification of the first person and the first transaction code. The verification symbols, namely, "personal identification" and "first transaction code" that are thus transmitted by the transaction server to the mobile terminal unambiguously identify the first person and the transaction having the associated transaction encoding. In a preferred embodiment, the transmitted first part of the first transaction encoding is displayed on the display element so that the first person can see the information and can confirm that he or she has correctly recognized it. The display of the personal identification and of the first transaction code on the display element of the mobile terminal is shown to the first person, who then checks whether it is correct, especially regarding the personal identification for completing the transaction in the name of the correct first person. As an alternative, the second person can also verbally inform the first person about the displayed symbols. The display on the display element at least gives the first person the possibility to view the symbols. Preferably, these symbols are graphic symbols, thereby facilitating the verification step and translating into a lower error rate during the continuation of the method according to the invention. A confirmation field on the display element provided by the transaction application allows the first person or the second person to confirm the correctness of the personal identification and of the first transaction code. This confirmation is transmitted from the mobile terminal to the transaction server.

If the first part encompasses the personal identification and the first transaction code, in one embodiment, the step of supplementation comprises the selection of a second transaction code as the supplement, with the involvement of the first person from among a plurality of different transaction codes using the mobile terminal of the second person, whereby only one of the selectable transaction codes matches the second transaction code of the first transaction encoding. This second transaction code can only be correctly selected with the involvement of the first person since only the first person knows the first transaction encoding in its entirety. Therefore, the only correct supplement to the transmitted first part of the first transaction encoding constitutes the verification for the transaction system which can then effectuate an approval of the transaction. Since this single correct supplement has to be selected from a plurality of different transaction codes, the risk of an unauthorized approval of the transaction is greatly reduced. In one embodiment, for purposes of selecting the second transaction code, preferably a graphic second transaction code, the plurality of different transaction codes, preferably graphic transaction codes, is displayed on the display element of the mobile terminal as an arrangement of the different transaction codes. The display of the different transaction codes in order to select one of them can be generated on the mobile terminal itself, for example, by the transaction application. In one embodiment, the plurality of transaction codes is transmitted by the transaction server to the mobile terminal in response to the confirmation that the first person has recognized it correctly. Only a single second transaction code can complete the already transmitted first part (personal identification and first transaction code) of the selected first transaction encoding in such a way that the first transaction encoding is reproduced by the selection of the correct second transaction code. In a preferred embodiment, the transaction codes are displayed on the display element as an arrangement with a random positioning and/or sequence of the transaction codes, for purposes of selecting the second transaction code. Thus, there is a high probability that the correct second transaction code can only be selected with the involvement of the first person, and this translates into greater security of the method. The first person informs the second person about the correct second transaction code that has to be selected, after which the second person (or the first person) selects this transaction code on the display element. In one embodiment, the selection of the second transaction code is made by actuating one of the transaction codes, preferably by tapping on one of the transaction codes if the display element is configured as a touchscreen, or else by clicking on one of the transaction codes on the display element using a cursor. Particularly the use of graphic symbols can markedly reduce the error rate during the selection of the correct second transaction code, which permits a virtually error-free continuation of the method according to the invention. After the confirmation, the selected transaction is transmitted to the transaction server.

In one embodiment, the selection triggers an automatic transmission of the selected second transaction code from the mobile terminal to the transaction server. The first person can now cross out the appertaining transaction encoding from his or her list of transaction encodings since, for security reasons, a given transaction encoding can only be used once in the transaction system. The transaction server now has to verify whether the transaction code transmitted from the mobile terminal in the last step is the correct transaction code, that is to say, the transaction code that matches the second transaction code of the first transaction encoding. For this purpose, the transaction server links the personal identification it has transmitted as well as the first transaction code to the transmitted transaction code selected by the mobile terminal as the second transaction code in order to form a supplemented transaction encoding, and then compares this supplemented transaction encoding in a comparing means (e.g. an appropriately configured processor) to the stored first transaction encoding associated with the first person. If the supplemented transaction encoding is identical to the first transaction encoding, the approval of the transaction is issued by the transaction server. Subsequently, the transaction server initiates the additional steps in the transaction system that are necessary for executing the transaction and it transmits an approval confirmation to the mobile terminal. This approval confirmation serves as a virtual electronic acknowledgement of the transaction. The second person shows the first person this approval confirmation and receives the product from the first person, for example, subsequent to the confirmation that the product has been paid for with this method. Moreover, through the approval confirmation, the first person can determine that the approval of the transaction relates to a transaction that is indeed intended for the first person. For this purpose, in one embodiment, the approval confirmation contains the entire first transaction encoding that was transmitted during the data traffic between the mobile terminal and the transaction server, and the acknowledgement can once again be verified by means of the comparison to the first transaction encoding on the list of the transaction encodings.

In one embodiment of the method, at the end of every day, the transaction system sends an automatic e-mail to the second person listing the transactions effectuated by the second person on this day as documentation that also indicates the first person and the time of day. Owing to the automatic feedback to the second person, this person has a documented overview of the transactions that have been executed. Moreover, this reduces the risk of fraudulent use. In the case of erroneous transactions, if applicable, the second person can contact the transaction system and/or the first person for clarification. The transaction system stores the transaction encodings that were used for the approvals. Thus, a first part of a transaction encoding that had already previously been transmitted to the mobile terminal of a second person cannot be transmitted again to the same person or to another second person in order to approve another transaction. Consequently, each transaction encoding can only be used once for approval, which further increases the security of the approvals.

The invention also relates to a transaction application that is stored on a storage medium and that is suitable for carrying out the method according to the invention in conjunction with a transaction system according to the invention. Here, the transaction application can be transmitted to the second person on external data carriers such as, for example, a SIM card, chips, memory sticks, CD-ROMs, etc. for purposes of installation on the mobile terminal, or else the second person himself can download the transaction application from the transaction system or from a website that distributes applications. Since the transaction application carries out numerous essential components of the transaction approval, there is also a need for the transaction application itself to be secured.

The invention also relates to a mobile terminal having a display element that can be connected to a transaction server of a transaction system according to the invention via a wireless data connection for purposes of data exchange, whereby a transaction application according to the invention is installed on the mobile terminal and can be executed on the mobile terminal. The term "mobile terminal" as used here encompasses all devices with a display element that are able to maintain a wireless data connection with the transaction server and that have application and e-mail capabilities such as, for example, a smartphone. The wireless data connection can be established, for example, via a mobile telecommunications network or a WLAN network.

The invention also relates to a transaction system to approve a transaction within the scope of a business transaction between at least a first person and a second person, comprising an application memory for storing a transaction application according to the present invention, a user database for storing at least first user data of the first person and second user data of the second person, a generating means for generating transaction encodings that each contain personal identification of the first person, a first transaction code, preferably a graphic first transaction code, and a second transaction code, preferably a graphic second transaction code, as well as a transaction server that is connected via data lines at least to the application memory, to the user database and to the generating means, and that is configured to provide at least the first and second user data, use suitable data transmission means to transmit a plurality of generated transaction encodings to the first person, whereby each of the transmitted transaction encodings differs unambiguously from the other transmitted transaction encodings, at least in terms of having different first and/or second transaction codes, establish a wireless data connection with the mobile terminal of the second person, enable a selection of the first person via the mobile terminal of the second person and, after the selection, to transmit a first part of a first transaction encoding to the mobile terminal of the second person so that it can be supplemented, receive a supplement transmitted from the mobile terminal and, with a comparing means, to link it to the first part of the first transaction encoding transmitted by the transaction server in order to form a supplemented transaction encoding, and to compare the supplemented transaction encoding to the first stored transaction encoding that is associated with the user data of the first person, and once it has been determined that the supplemented and the stored first transaction encodings are identical, to issue the approval for this transaction and to transmit an approval confirmation to the mobile terminal or, if it has been determined that they are not identical, to refuse the approval and to transmit the refusal to the mobile terminal.

In one embodiment, the transaction server is configured to use suitable data transmission means to transmit the transaction application to a mobile terminal of the second person. This direct transmission avoids the need for additional actions on the part of the user in order to the start up the transaction application and is consequently user-friendly. Preferably, the transaction application installs itself on the mobile terminal immediately after being transmitted. Preferably, the transaction application transmits to the transaction server the data needed to connect to the mobile terminal. In this manner, at the same time, the required wireless connection between the mobile terminal and the transaction server can be verified.

In one embodiment, the transaction system comprises a website for at least the first person to be registered in the transaction system and for data to be entered at least by the first person in order to generate first user data. The website for the registration, however, can also be used by other persons for such a registration procedure. Preferably, however, the second persons register themselves via the transaction application after its first boot on the mobile terminal.

An advantage of the transaction system according to the invention is the minimal number of electronic devices that the first and second persons are required to have, as described above. The first person merely needs a plurality of transaction encodings, which are transmitted by the transaction system. The manner in which the first person receives or obtains this list can be configured in different ways. This transmission can be made to an electronic device of the first person, for example, an Internet-capable laptop, a computer, a smartphone, etc. As an alternative, the transaction system can also send the plurality of transaction encodings as a list in paper form to the first person via regular mail, so that the first person does not need any electronic device at all in order to receive the list. For the approval of a transaction, when first and second user data is available, the method according to the invention only requires the second person to have a mobile device with a data connection to the transaction server. Consequently, the transaction system can be used by any first person, regardless of which devices he or she has. Therefore, the method according to the invention is particularly advantageous for first persons who run a small business, perhaps in a cramped space, and who nevertheless wish to offer their customers (second persons) better service by permitting electronic transaction approvals, for example, cashless payments. Since the method supports the execution of all kinds of transactions, especially all kinds of different payment systems and modes of payment through the approval modality and, if applicable, additional support through the subsequent execution and indication of the transaction to third parties involved in the transaction (e.g. banks of the first and second persons), it is also advantageous for the second persons. They can, for example, make cashless payments where this had not been possible until now because the first persons did not have adequate equipment.

The invention also relates to a payment system having a transaction system according to the present invention, having at least one mobile terminal according to the present invention that is connected to the transaction system via a wireless data connection in order to carry out a method according to the present invention, and having at least one money management system that is connected to the transaction system in order to execute the transaction between the first and second persons after approval by the transaction system. Money management systems as set forth in the present invention are, for example, banks where first and second persons have accounts. In the payment system according to the invention, for example, the first person can also keep an electronic cash book in this manner. For this purpose, the transaction system sends to the second persons a list of the executed transactions with information pertaining to the transaction data (for instance, the amount to be booked for a cashless payment stemming from the approved transaction, the time of day, etc.). The first person can receive this list from the transaction system as an electronic list of transactions that had to be effectuated (for example, payments that had to be effectuated) and the first person can enter the amounts actually received in the account of the first person into appropriate fields in this list. In this manner, the first person can keep an electronic cash book. This electronic cash book is placed, for example, under the account of the first person on the website of the transaction system. In order to keep the electronic cash book, all that the first person needs is precisely the same technical devices that he or she also needs for the transmission of the plurality of transaction encodings. As an alternative, the first person can also keep the electronic cash book using the first-person application on his or her smartphone.

BRIEF DESCRIPTION OF THE FIGURES

These and other aspects of the invention are shown in detail in the figures as follows.

DETAILED DESCRIPTION OF THE EMBODIMENTS

Figure 1:
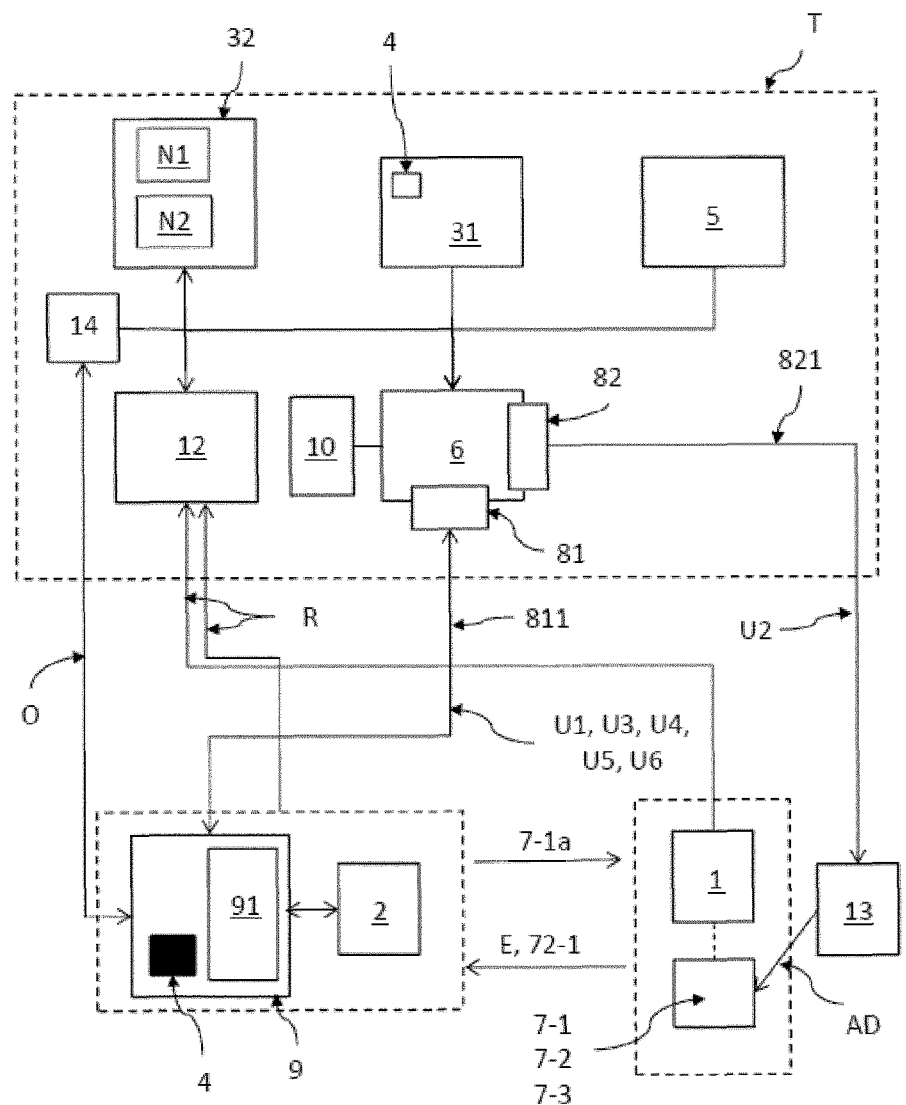
FIG. 1—an embodiment of the transaction system according to the invention.

FIG. 1 shows an embodiment of the transaction system T according to the invention in conjunction with a mobile terminal 9 of a second person 2 as well as a transaction application 4 installed on it in order to approve a transaction within the scope of a business transaction between at least a first person 1 and a second person 2. The data connection between the transaction system T and the mobile terminal 9 of the second person 2 is established via a wireless data connection 811 to the transaction server 6 using appropriate data transmission means 81. In order for the transaction system T to be able to carry out the method according to the invention and in order for it to also initiate it after approval of the transaction, the transaction system T needs user data N1, N2 of the first person 1 and of the second person 2 that the transaction server 6 can access via data connections between the components of the transaction system T. In order for it to be possible for the user data N1, N2 to be entered into the transaction system T, in this embodiment, said transaction system T comprises a website 12 for registering R at least the first person 1 in the transaction system T and for entering data by at least the first person 1 in order to generate first user data N1. This website is provided, for example, by the transaction server 6 via the Internet or on client computers that are connected to the transaction server 6. The website 12 is also suitable for registering R the second person 2 so that he or she can enter user data N2 pertaining to said second person 2. As an alternative, the second user data N2 can also be transmitted from the mobile terminal 9—if applicable, during the execution of the transaction application 4—to the transaction server 6 via a wireless data connection 811 using the data transmission means 81. The user data N1, N2 is stored in a user database 32 in the transaction system T to which the transaction server 6 has access via data connections.

In this embodiment, the transaction server 6 is additionally connected via a data transmission means 82 and via a data connection 821 to a printer 13 of the first person 1. In this embodiment, a plurality (7-1, 7-2, 7-3, . . . ) of transaction encodings 7 are transmitted U2 by the transaction server 6 to the first person via this data connection 821. Preferably, the transmission U2 of the plurality of transaction encodings 7 to the first person 1 is carried out by printing out AD the transaction encodings 7 on the printer 13 of the first person 1. The transaction encodings 7 are generated with a generating means 5 that is connected to the transaction server 6 via a data line in order to transmit the transaction encodings 7. In one embodiment, the transaction encodings 7 each contain a personal identification 70 of the first person 1, a first transaction code 71, preferably a graphic first transaction code 71, and a second transaction code 72, preferably a graphic second transaction code 72, as is shown in detail in FIG. 2. Each of the transaction encodings 7 transmitted U2 to the first person 1 differs unambiguously from the other transmitted transaction encodings 7, at least in terms of having different first and/or second transaction codes 71, 72.

The application memory 31 is also provided in order to store the transaction application 4 so that it can be downloaded from the transaction system T via the transaction server 6 or transmitted in some other manner to the mobile terminal 9 in order to be installed there so that the method according to the invention can be carried out. For this purpose, the transaction server 6 is equipped with suitable data transmission means 81 to transmit U1 the transaction application 4 via the wireless data connection 811 to the mobile terminal 9 of the second person 2. Via this data connection 811, the transaction server 6 also transmits U3 to the mobile terminal 9 of the second person 2 data that is suitable for selecting AW1 the first person 1 and that is displayed in a suitable form on the display element 91 of the mobile terminal 9 for purposes of selecting the first person 1. After the selection AW1 of the first person 1, in order to approve a transaction via said data connection 811, the transaction server 6 transmits U4 a (first) part 7-1a of a first transaction encoding 7-1 to the mobile terminal 9 of the second person 2. By the same token, via the wireless data connection 811, the supplement E of the first part 7-1a—here, for example, the second transaction code 72-1—that has been selected for the approval of the transaction, is transmitted U5 from the mobile terminal 9 to the transaction server 6. After the transaction server 6 has received the supplement E, said supplement E is linked V to the first part 7-1a with a comparing means 10 in order to form a supplemented transaction encoding 7-E. The supplemented transaction encoding 7-E is compared VG by means of the comparing means 10 to the stored first transaction encoding 7-1 associated with the user data N1 of the first person 1. Once it has been determined that the supplemented and the stored first transaction encodings 7-E, 7-1 are identical, the approval F for this transaction is transmitted U6 as the approval confirmation 11 to the mobile terminal 9 via the wireless data connection 811. The application memory 31 can also serve for storing and providing additional applications such as, for example, the first-person application.

In one embodiment, the transaction system is configured in such a way that, in order to select AW1 the first person 1, the position of the mobile terminal 9 is located O using a module 14 for locating the position of the mobile terminal 9, so that, on the basis of the determined position of the mobile terminal 9, data pertaining to all of the first persons 1 who are present within a given area around the mobile terminal 9 is transmitted U3 to the mobile terminal 9. The area can be suitably predetermined by the transaction system T or selected by the second person 2. The positioning procedure O can be carried out, for example, by means of a satellite-assisted positioning system (for example, GPS or Galileo).

The components of the transaction system T shown here (as an area delimited by a broken line) can be configured as separate components that are connected to the transaction server 6 via data lines, or else they can be integrated into the transaction server 6 as sub-components. Depending on the task at hand, the components selected by a person skilled in the art can be processors, data memories units or other types of components. The transaction system T can be configured, for example, as a network with one or more transaction servers 6 having an Internet connection, or it can additionally comprise one or more computers that provide the website 12 (in a web portal) and that are connected to the transaction server(s) 6 and, if applicable, to the additional components of the transaction system T. In a client-server network, the transaction servers 6 are the servers (backend), whereas the computers via which the first and/or second persons operate the website 12 of the transaction system T form the clients (frontend). When the term "transaction server" is used within the scope of this invention, this always includes the possibility of using several transaction servers.

Figure 2:
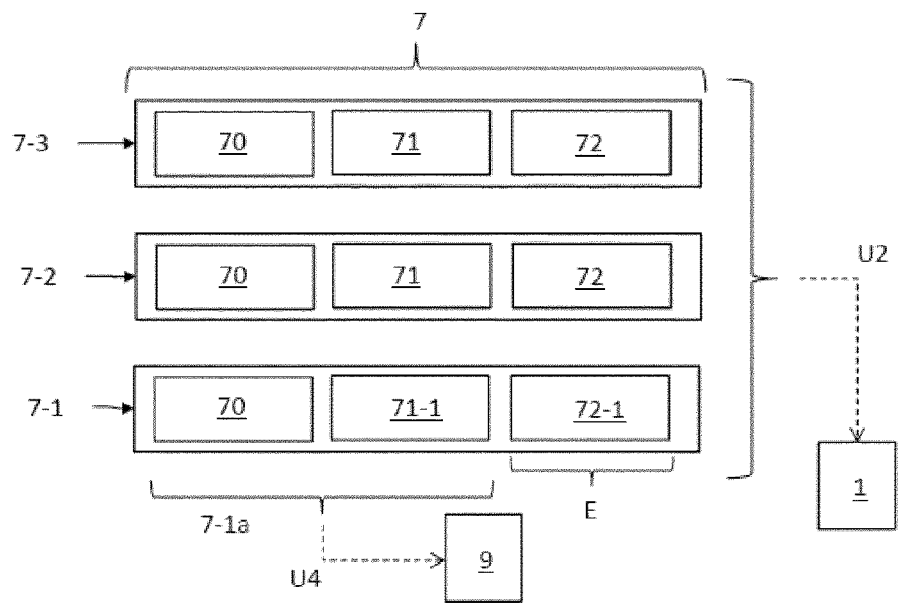
FIG. 2—an embodiment of the transaction encodings to be transmitted.

FIG. 2 shows an embodiment of the transaction encodings that are to be transmitted. Here, the transaction encoding 7 comprises a personal identification 70 of the first person 1, a first transaction code 71 and a second transaction code 72. Here, the transaction encodings 7 generated in the generating means 5 and transmitted by using the transaction server 6 to the first person 1 differ unambiguously from each other, for example, at least in terms of having different first and/or second transaction codes 71, 72. The transaction codes and the personal identification can be suitably selected by the person skilled in the art, for example, as alphanumeric codes. For purposes of achieving a better recognition of the transaction encodings 7, preferably graphic codes or symbols are used for the personal identification 70, for the first transaction code 71 and for the second transaction code 72. In different embodiments, the plurality of transaction encodings to be transmitted U2 to the first person 1 can comprise a different number of transaction encodings 7-1, 7-2, 7-3, . . . . The number of transaction encodings 7 to be transmitted U2 can be, for example, predetermined in the transaction system T or selected by the first person 1 via the website 12. The first part 7-1a of the first transaction encoding transmitted U4 to the mobile terminal 9 in method step (b) comprises the personal identification 70 and the first transaction code 71. In other embodiments, the first part 7-1a can also be configured differently. The part (second part) of the transaction encoding 7-1 that is not transmitted, namely, the correct supplement E, has to be selected by the second person 2 via the mobile terminal 9 so that the first part 7-1a and the supplement E transmitted U5 at a later point in time from the mobile terminal correspond to the first transaction encoding 7-1 once they have been linked together as a supplemented transaction encoding 7-1. In the present application, the term "first transaction encoding" is used in such a way that the transaction encoding 7-1 that is used for the approval of the transaction and that is to be verified by the transaction system T can be distinguished from the other transaction encodings 7-2, 7-3, . . . , which are not used for this approval. After the first transaction encoding 7-1 has been used for the approval of a transaction (or after its use led to the refusal of the approval), this transaction encoding cannot be used anew for another transaction. Therefore, the transaction encodings that have already been used are associated with the user data and stored in the user database 32. For the next approval of a transaction, one of the remaining transaction encodings 7-2, 7-3, . . . that have been transmitted to the first person are used. This transaction encoding that is now to be used can be the numerically subsequent transaction encoding 7-2 on the list of the transaction encodings that have been transmitted. In this case, the transaction encoding 7-2 constitutes the first transaction encoding for carrying out the method. In another embodiment, the transaction encoding to be used is selected by the transaction server 6, for example, the transaction encoding 7-3. In this case, the transaction encoding 7-3 constitutes the first transaction encoding for carrying out the method. Here, the information as to which of the transaction encodings was selected for the subsequent approval of the transaction is transmitted U4 together with the first part (here it then corresponds to 7-3a) to the mobile terminal 9. The transmitted plurality of transaction encodings comprises a corresponding numbering 1, 2, 3, . . . of the individual transaction encodings 7-1, 7-2, 7-3, . . . so that the corresponding part E can be supplemented.

Figure 3:
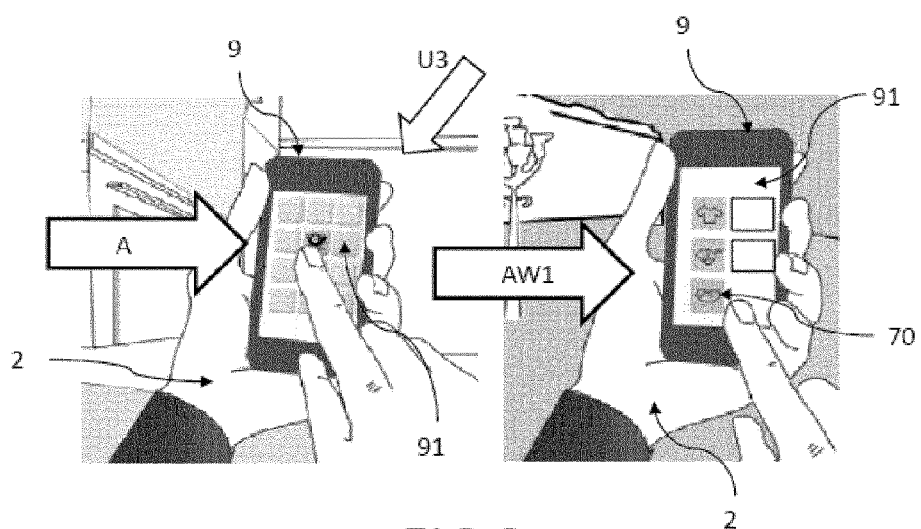
FIG. 3—an embodiment of the data displayed on the display element of the mobile terminal for selection of a first person.

FIG. 3 shows an embodiment of the data displayed on the display element 91 of the mobile terminal 9 for the selection AW1 of the first person 1. For this purpose, the transaction application 4 is started A by the second person 2 in order to receive the data that is to be transmitted U3 for the selection AW1 of the first person 1, as is shown in the left half of FIG. 3. The start of the transaction application can comprise an authorization of the second person 2 in the form of the entry of appropriate identification information. These individual steps are not shown in detail here and they can be appropriately selected by the person skilled in the art. After the position of the mobile terminal 9 has been located O, the appropriate data of the first person 1 with his or her own positions within a given area around the determined position of the mobile terminal 9 is transmitted U3 by the transaction server 6 to the mobile terminal 9. For the sake of greater clarity, the transaction application 4 shows to the first persons 1 a scroll-down menu on the display element 91. Here, in order to facilitate the selection, the first persons are displayed on the basis of their graphic personal identifications 70. For example, a pretzel is used here as the personal identification 70 to designate a bakery shop of one of the first persons 1, whereas a T-shirt is used as the personal identification 70 to designate the clothing shop of another first person 1. Depending on what the second person 2 is looking for, he or she selects AW1 one of the displayed first persons 1 by pressing on the personal identification 70 of the one sought first person 1, for example, on the pretzel symbol 70. As a result of the selection AW1, in one embodiment, additional data about the selected first person 1 transmitted by the transaction server 6 can now be displayed together with the selected personal identification 70, so that the second person 2 can check if the selection of the first person was made correctly, for example, on the basis of a displayed address of the bakery shop of the first person. If applicable, the second person can return to the selection in the transaction application 4 by actuating an appropriate field on the display element 91 so that, in case of an error, he or she can make a different selection of a first person 1.

Figure 4:
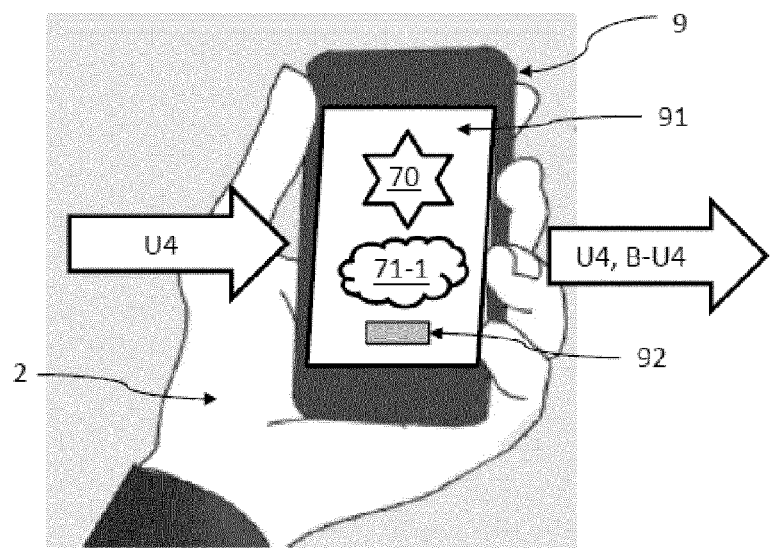
FIG. 4—an embodiment of the first part of the first transaction encoding displayed on the display element of the mobile terminal and transmitted by the transaction server.

After a selection AW1 or a confirmation of the selection AW1 of the first person 1, the transaction server 6 transmits U4 the first part 7-1a of the first transaction encoding 7-1 to the mobile terminal 9. However, this transmission can be preceded by the subsequent data entries (transaction data). After a transaction has been agreed upon between the first person 1 and the second person 2 in the bakery shop of the first person 1, the second person can enter information about the desired transaction via the display element 91, said information being later transmitted to the transaction server, for example, information about the price of a product to be purchased, about the type of transaction itself (payment as transaction) and, if applicable, also security information such as a security PIN. The person skilled in the art can suitably select the configuration of the applicable entry fields in the transaction application. In one embodiment, the first part 7-1*a* of the first transaction encoding 7-1 is transmitted in response to the transmission of this information to the transaction server 6. In another embodiment, the transmission U4 takes place in response to the selection AW1 of the first person that has been transmitted to the transaction server 6. FIG. 4 shows an embodiment of the first part 7-1*a* of the first transaction encoding 7-1 that was displayed on the display element 91 of the mobile terminal 9 and that was transmitted by the transaction server 6, whereby here, a star 70 is displayed as the personal identification 70 instead of the bakery shop pretzel of FIG. 3. This serves to illustrate the wide variety of possible symbols that can be used. The personal identification 70 transmitted in the first part 7-1*a* would be the selected pretzel 70 in the case of the bakery shop. Together with the personal identification 70, the first part 7-1*a* of the first transaction encoding also comprises a cloud 71-1 as the first transaction encoding 71-1 of the first transaction encoding 7-1. This first part 7-1*a* unambiguously identifies the first person 1 and the transaction that is to be approved. After the first part 7-1*a* has been displayed D on the display element 91 by the transaction application 4, the second person then names, for example, the displayed symbols, or else the first person 1 personally checks the display D on the display element 91. The correct designation of the first person 1 by the personal identification 70 and the designation of the first transaction encoding 7-1 by the first transaction code 71 are confirmed by actuating a confirmation field 92, after which the confirmation B-U4 is transmitted to the transaction server. The transaction server stores the transaction data that was entered together with the confirmation B-U4, or the previously transmitted transaction data belonging to the transaction in conjunction with the first transaction encoding 7-1 belonging to the transaction.

Figure 5:
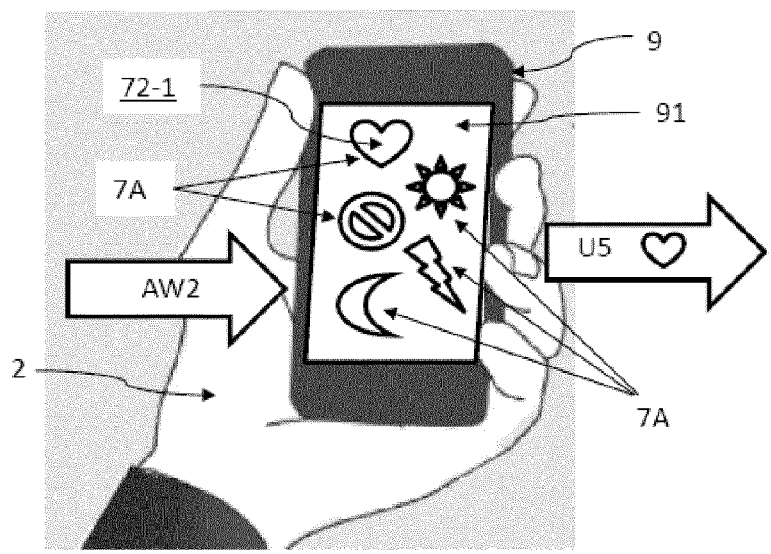
FIG. 5—an embodiment of the transaction code displayed on the display element of the mobile terminal for selecting the second transaction code for transmission to the transaction server.

In order for the transaction to be approved, the first part 7-1*a* of the first transaction encoding 7-1 displayed on the display element 91 has to be supplemented E correctly by selecting the symbol that corresponds to the second transaction code 72-1 so as to determine a correspondence with the transaction encoding 7-1 that is known in its entirety only to the first person 1 after its having been transmitted U2 by the transaction server 6. In various embodiments, the supplement E can be supported and executed differently by the transaction application 4. In one embodiment, after the display D of the first part 7-1*a*, the transaction application 4 generates a plurality of symbols 7A that can be selected on the display element 91. Together with the first person who, for instance, informs the second person about the correct symbol, the second person selects AW2 the symbol corresponding to the second transaction code 72-1 of the first transaction encoding 7-1 as the supplement E to the first part 7-1*a*, which is transmitted U5 to the transaction server 6 subsequent to the selection AW2. In another embodiment, the confirmation of the first part 7-1*a* is transmitted—for example, by actuating the confirmation field 92—to the transaction server which, in response to the confirmation, transmits a plurality of selectable transaction codes 7A to the mobile terminal 9, which are then displayed on the display element 91 by the transaction application 4 so that the selection AW2 can be made. In another embodiment, the transaction application 4 generates the plurality of selectable transaction codes 7A after the confirmation of the first part 7-1*a* and displays this on the display element 91. For example, the selectable transaction codes 7A comprising the second transaction code 72-1 are displayed on the display element 91 as an arrangement with a random positioning and/or sequence of the transaction codes 7A. FIG. 5 shows an embodiment of the transaction codes 7A displayed on the display element of the mobile terminal in order to select the second transaction code 72-1 for transmission U5 to the transaction server 6. The display generated here according to one of the previously described embodiments contains graphic symbols (heart, star, sun, lightning bolt, moon) as transaction codes 7A to be selected that are easy to distinguish so that, in contrast to alphanumeric encodings, they can be selected AW2 with a low error rate. The second transaction codes 72-1 as the supplement to the first part 7-1*a* are selected AW2, for example, through the actuation of one of the transaction codes 7A, preferably by tapping on one of the displayed transaction codes 7A on a display element 91 configured as a touchscreen or by using a cursor to click on one of the transaction codes 7A on the display element 91. As a result of this selection AW2, the selected transaction code 72-1 is transmitted U5 as the supplement E to the transaction server 6. This transmission can be automatically carried out in response to the selection made, or else the selection is verified with an additional confirmation step that itself then triggers the transmission of the selected transaction code. For example, the first person 1 himself can make the selection AW2 by means of an appropriate actuation of the mobile terminal 9 if, for instance, for security reasons, the second person is not supposed to be informed about the correct supplement 72-1. In case an additional confirmation step is involved, if there is no confirmation, the transaction application makes it possible to return to the display of the plurality of selectable transaction codes 7A so that the correct selection AW2 can be made. For purposes of verification of the selection AW2 by the first person 1, acoustic identification signals, for instance, can be stored for the symbols in the transaction application 4. For instance, when the symbol "dog" is actuated, the mobile terminal 9—controlled by the transaction application—emits the sound of a dog barking so that the first person 1 can also acoustically verify the correct entry of the second transaction code 72-1 as the supplement. Therefore, it is preferable to use only symbols that can be unambiguously associated with acoustic signals. These associated acoustic signals are stored in the transaction application and are emitted audibly on the basis of the selection made via the mobile terminal. If an acoustic signal is not correctly identified, the selection AW2 can also be carried out and/or confirmed visually.

Figure 6:
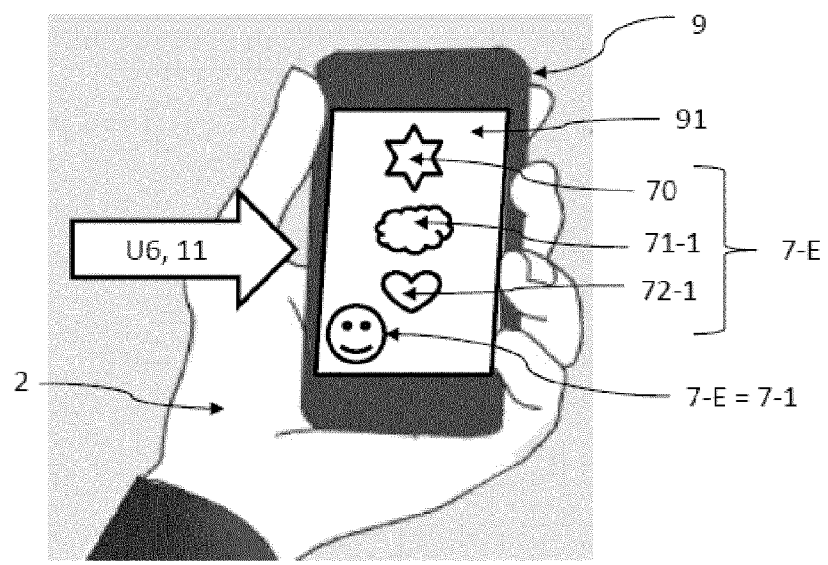
FIG. 6—an embodiment of the approval confirmation displayed on the display element of the mobile terminal and transmitted by the transaction server.

After the transaction system T has generated a supplemented transaction encoding 7-E using the comparing means 10 on the basis of the transmitted selected supplement E and of the transmitted first part 7-1*a* by means of linking V, and after the transaction system T has compared VG the supplemented transaction encoding 7-E to the first transaction encoding 7-1, then the transaction server 6 transmits U6 an approval of the transaction to the mobile terminal 9 as is shown by way of an example in FIG. 6, provided that the supplemented transaction encoding 7-E corresponds to the first transaction encoding 7-1. For example, the approval confirmation 11 is confirmed in the form of a display of the complete first transaction encoding 7-1 on the display element 91, together with the information indicating that the transaction has been approved. This information about the approval can be displayed, for example, as plain text or as an appropriate symbol, here, for instance, as a happy smiley. This approval information 11 serves the first person as a virtual receipt to document the approved transaction, for example, a payment transaction. As the confirmation process of the transaction approval (or of the transaction), the transaction system T can send documentation of a transaction to a secure e-mail address of the second person 2 stored in the user data N2 of the second person 2. Thus, the second person has an overview of the effectuated transactions with the associated data, for example, the paid amounts. This documentation of the transaction permits a verification of the transaction approvals by the second person and thus offers protection against possible fraudulent use.

Figure 7:
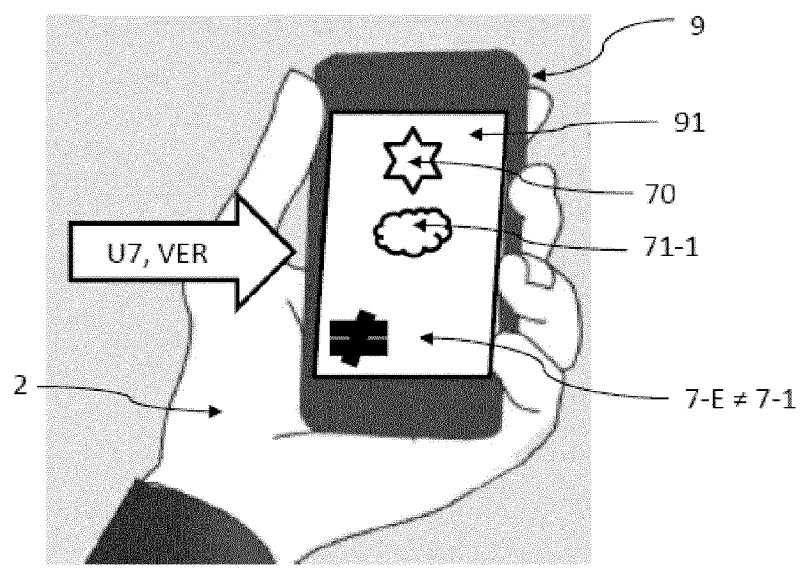
FIG. 7—an embodiment of the refusal displayed on the display element of the mobile terminal and transmitted by the transaction server.

If the supplemented transaction encoding 7-E does not correspond to the first transaction encoding 7-1, the transaction server 6 transmits U7 the refusal VER to approve the transaction to the mobile terminal 9 as is shown in FIG. 7 by way of example. For instance, the refusal of the approval is displayed in the form of a display of the first part 7-1a of the first transaction encoding 7-1 on the display element 91, together with information indicating that the transaction has been refused. This information about the refusal can be displayed, for instance, as plain text or as an appropriate symbol such as, for example, a not-equal sign.

Figure 8:
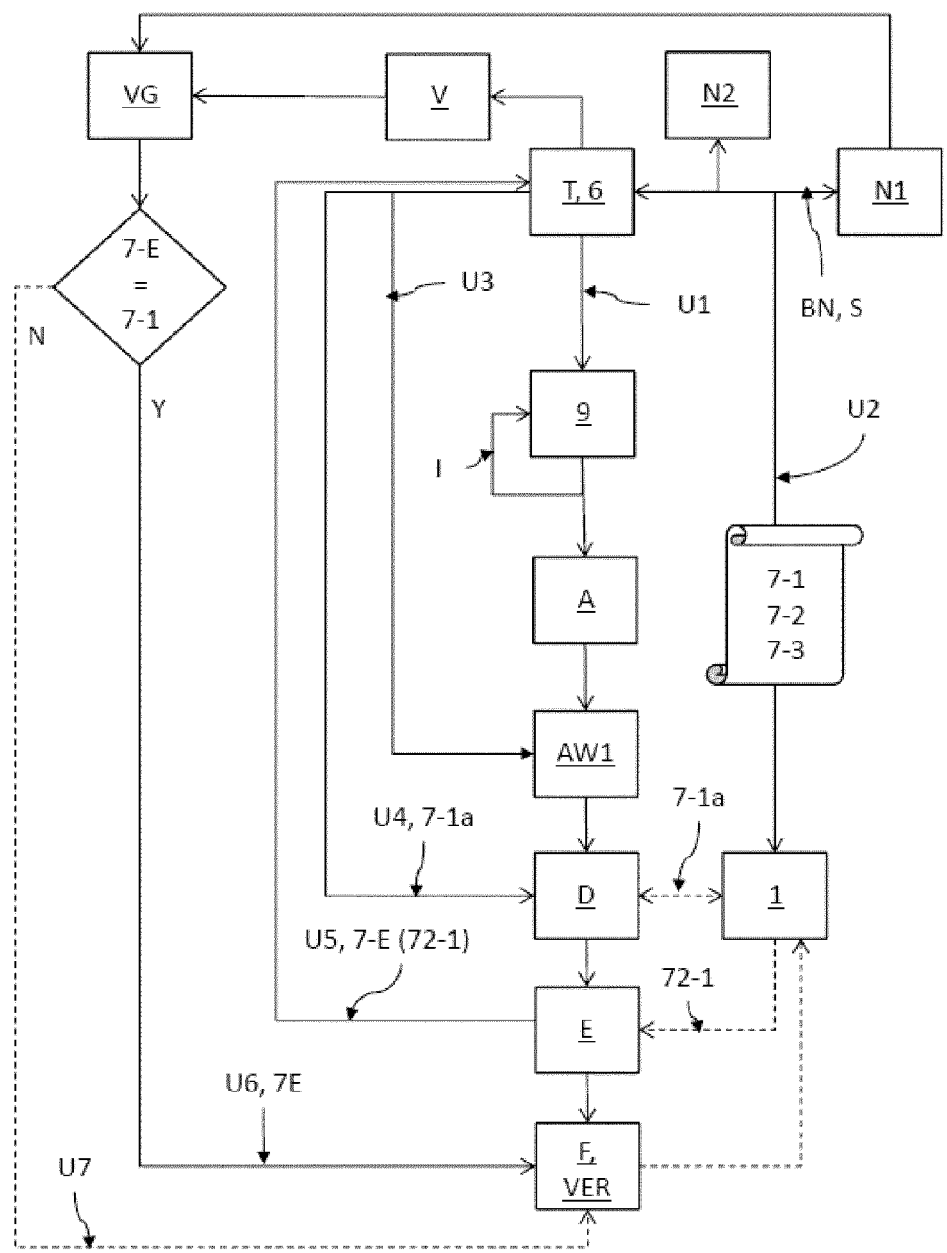
FIG. 8—an embodiment of the method according to the invention.

FIG. 8 shows an embodiment of the electronic method according to the invention to approve a transaction within the scope of a business transaction between at least a first person 1 and a second person 2 via a mobile terminal of the second person, who is not shown here explicitly. The transaction application 4 is transmitted U1 by the transaction system 6 [sic] to the mobile terminal 9 and installed on the mobile terminal 9 (automatically or after additional operating steps). Moreover, first user data N1 of the first person 1 and second user data N2 of the second person 2 are provided BN by the transaction system T for access by the transaction server 6. Here, the user data is stored S in a user database 32. Moreover, a plurality of transaction encodings 7-1, 7-2, 7-3, . . . is transmitted U2 by the transaction server 6 to the first person 1, whereby each transaction encoding 7 comprises a personal identification 70 of the first person 1, a first transaction code 71 and a second transaction code 72, whereby each of the transmitted transaction encodings 7 unambiguously differs from the other transmitted transaction encodings 7, at least in terms of having different first and/or second transaction codes 71, 72. If there is no data connection between the transaction server and at least one printer of the first person, then the plurality of transaction encodings from the transaction system T can also be transmitted to the first person 1 in some other manner (for example, on a data carrier by regular mail). The transmitted transaction encodings 7 are stored S in the transaction system and associated with the first user data N1 of the first person 1. As an alternative, the transmitted U2 transaction encodings 7 are also stored as part of the user data in the user database. With an eye towards carrying out the method according to the invention, the transaction application 4 is executed A on the mobile terminal 9 of the second person 2 in order to connect the mobile terminal 9 to the transaction server 6 and at least to control the approval of the transaction so as to complete the business transaction with the first person 1. In a first step, the first person 1 is selected AW1 by the second person 2 via the mobile terminal 9, preferably on the basis of data that is transmitted U3 by the transaction server 6 to the mobile terminal 9. Then at least a part 7-1a (first part) of a first transaction encoding 7-1 is transmitted U4 by the transaction server 6 to the mobile terminal 9 of the second person 2 and displayed D on the display element 91 so as to allow the first person 1 to see it and so that the first person 1 can confirm that he or she has properly seen this. The transmitted part 7-1a (first part) of the first transaction encoding 7-1 is supplemented E by the first person 1 to form a complete first transaction encoding, and the supplement 72-1 is transmitted 7 to the transaction server 6. As the supplement, the step of supplementation E can comprise the selection AW2 of a second transaction code 72 by the second person 2 from among a plurality of different transaction codes 7A using the mobile terminal 9 of the second person 2, whereby only one of the selectable transaction codes 7A corresponds to the second transaction code 72-1 of the first transaction encoding 7-1. Preferably, the selection AW2 triggers an automatic transmission U5 of the selected second transaction codes 72-1 from the mobile terminal 9 to the transaction server 6. In the transaction system T, the part 7-1a of the first transaction encoding 7-1 that has been transmitted by the transaction server 6 is linked V to the supplement 72-1 in order to form a supplemented transaction encoding 7-E, and the supplemented transaction encoding 7-E is compared VG to the stored first transaction encoding 7-1 associated with the user data N1 of the first person 1, and if the comparison result is positive ("Y"), an approval F of the transaction is issued by the transaction server 6 and an approval confirmation 11 is transmitted U6 to the mobile terminal 9. If the comparison result is negative ("N"), the refusal VER to approve the transaction is transmitted U7 by the transaction server 6 to the mobile terminal 9. Both transmitted responses to the comparison result 11 VER can be seen by the first person on the display element of the mobile terminal 9 (arrow drawn with broken line in FIG. 8).

Figure 9:
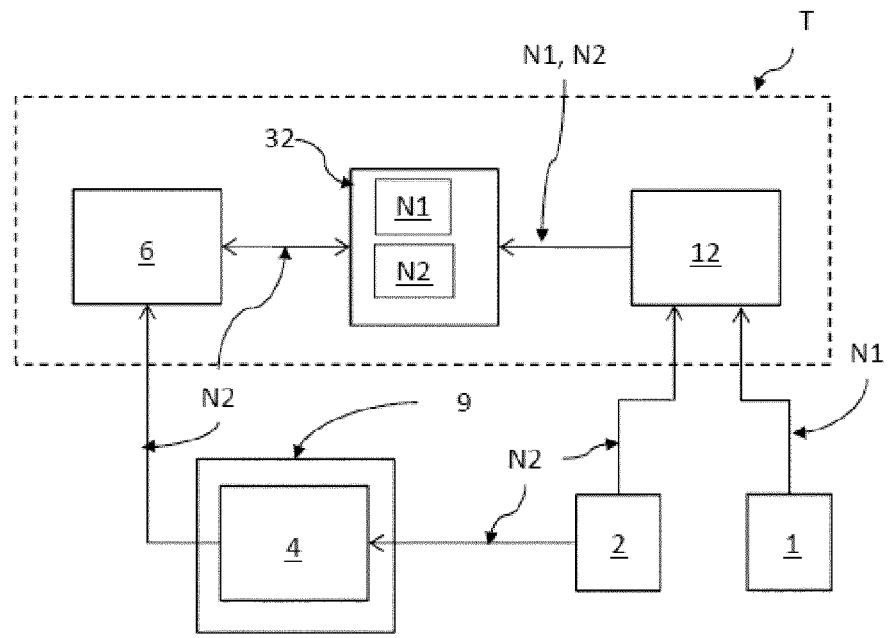
FIG. 9—an embodiment of the step of registration of the first and second persons in the transaction system according to the invention.

FIG. 9 shows an embodiment of the step of registration R of the first person 1 and the second person 2 in the transaction system T according to the invention in order to generate first user data N1 and second user data N2, whereby the registration R of the first person 1 and the second person 2 can be carried out via a website 12 of the transaction system T in that these persons provide data. This user data N1, N2 is stored in a user database 32 which the transaction server 6 can access via a data connection. As an alternative, the second person can register by executing the transaction application 4. Here, after a wireless data connection 811 to the transaction server 6 has been established, a first boot of the transaction application 4 which had been previously installed on the mobile terminal 9 automatically starts the step of registration of the second person 2, and preferably, the contact data for establishing the wireless data connection 811 is automatically transmitted to the transaction server 6. The transaction application was previously downloaded and installed onto the mobile terminal 9, for example, from an app store. The second user data is received by the transaction server 6 and forwarded to the user database 32 in order to be stored S.

Figure 10:
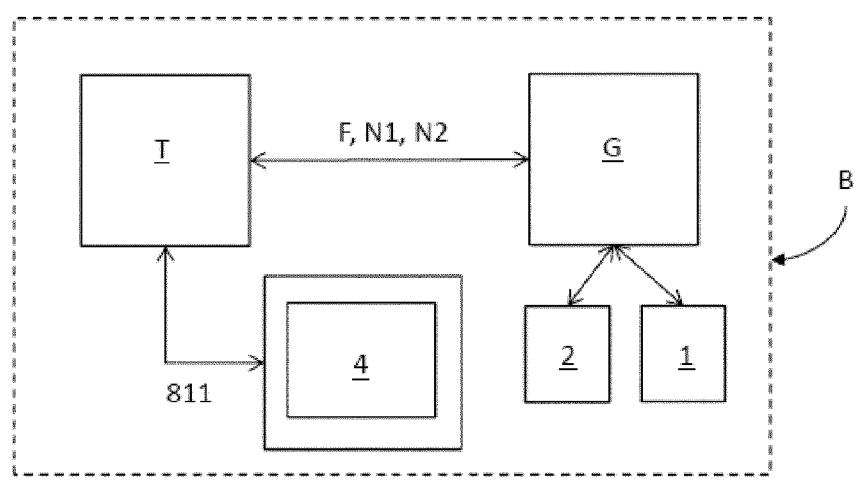
FIG. 10—an embodiment of a payment system with the transaction system according to the invention, and a money management system for executing the transaction after the approval according to the invention.

FIG. 10 shows an embodiment of a payment system B having a transaction system T according to the invention and having a money management system G for processing the transaction after the approval F according to the invention. In the payment system B, the transaction system T is connected at least to a mobile terminal 9 and at least to a money management system G via data connections. The data connection to the money management systems G can be configured commensurately. In order to execute the transaction that was approved by the transaction server 6, the first user data N1 and the second user data N2 as well as a corresponding approval F are transmitted by the transaction system T to the money management system G, after which, in response to this transmission, the money management system G executes the transaction according to the first user data N1 and the second user data N2. Here, the approval also includes the transaction data that comprises, for example, the amount to be paid. The money management system transmits notifications to the first and second persons about the executed transactions that were approved by the transaction system. In one embodiment, the information that is transmitted to the first person 1 is configured in such a way that the first person 1 can keep an electronic cash book containing the amounts of the approved transactions and their entry into the money management system G. For this purpose, as is the case for the registration, the first person 1 needs Internet access with the appropriate hardware. Preferably, the electronic cash book is provided to the first person 1 via the website 12 of the transaction system T.

The embodiments shown here are merely examples of the present invention and consequently must not be construed in a limiting manner. Alternative embodiments taken into consideration by the person skilled in the art are likewise encompassed by the scope of protection of the present invention.

LIST OF REFERENCE NUMERALS 1 first person
2 second person
31 application memory
32 user database
4 transaction application
5 generating means
6 transaction server
7 transaction encodings
7-1 first transaction encoding
7-1a first part of the first transaction encoding
7-2 second transaction encoding
7-3 third transaction encoding
70 personal identification
71 first transaction code
72 second transaction code
71-1 first transaction code of the first transaction encoding
72-1 second transaction code of the first transaction encoding
7A transaction codes that can be selected on the mobile terminal
7-E supplemented transaction encoding
81 data transmission means (mobile terminal transaction server)
811 wireless data connection between the mobile terminal and the transaction server
82 data transmission means (transaction system first person)
821 data connection between the transaction server and the printer of the first person
9 mobile terminal
91 display element of the mobile terminal
92 confirmation field on the display element
10 comparing means (to compare 7-E to 7-1, 7-2, 7-3, . . . )
11 approval confirmation
12 website of the transaction system
13 printer of the first person
14 module for locating the position of the mobile terminal
A execution of the transaction application
AD printing out the plurality of transaction encodings by the first person
AW1 selecting the first person
AW2 selecting the second transaction code as the supplement
B payment system
BN providing user data
B-U4 confirmation of the transmitted first part of the first transaction encoding
D display of the transmitted part of the first transaction encoding on the display element of the mobile terminal
E supplementing/supplement of the transmitted part of the first transaction encoding in order to form a complete first transaction encoding
F approval of the transaction
G money management system
I installation of the transaction application on the mobile terminal
N1 first user data
N2 second user data
O locating the position of the mobile terminal
R registration of the first and second persons in the transaction system
S storing the transmitted transaction encodings and associating them with the first user data
T transaction system
U1 transmitting the transaction application to the mobile terminal
U2 transmitting a plurality of transaction encodings to the first person
U3 transmitting data for selecting the first person to the mobile terminal
U4 transmitting a part of the first transaction encoding to the mobile terminal
U5 transmitting the selected second transaction codes to the transaction server
U6 transmitting the approval of the transaction to the mobile terminal
U7 transmitting the refusal of the approval of the transaction to the mobile terminal
V linking the transmission transaction codes and personal identification in order to form a supplemented transaction encoding
VER refusal to approve the transaction
VG comparing the supplemented and stored first transaction encodings

The invention claimed is:

1. A method comprising:
downloading, by a transaction server, a mobile application to a user mobile terminal;
determining, by the transaction sever, a position of the mobile terminal;
transmitting, by the transaction server to the mobile terminal and based on the determination, second user data;
generating, by the transaction server, an encoding wherein the encoding comprises seller identification information, a first transaction code, and a second transaction code;
storing, by the transaction server, the encoding in a user database;
sending, by the transaction server to a seller terminal, a copy of the first transaction code;
displaying, by the mobile terminal, transmitted second user data;
selecting, by the mobile terminal, displayed second user data, wherein selecting comprises actuating a display element on the mobile terminal;
transmitting, by the mobile terminal to the transaction server, the selected second user data;
transmitting, by the transaction server to the mobile terminal, a copy of the encoding;
displaying, by the mobile terminal, seller identification information of the copy of the encoding, a first transaction code of the copy of the encoding, and a confirmation field;

receiving, by the mobile terminal, actuation of the confirmation field;

receiving, by the mobile terminal from the transaction server based on the actuation a plurality of symbols, wherein at least one of the plurality of symbols corresponds to the second transaction code of the encoding;

displaying, by the mobile terminal, the plurality of symbols;

receiving, by the mobile terminal, a selection of one of the displayed plurality of symbols;

transmitting, by the mobile terminal to the transaction server, the selection;

accessing, by the transaction server and based on the transmitted selection, the second transaction code of the encoding corresponding to the selection;

comparing, by the transaction server, the second transaction code of the encoding and the selection; and sending, by the transaction server to the seller terminal, an approval.

2. The method of claim 1, wherein the first transaction code is a first graphic transaction code.

3. The method of claim 1, wherein the second transaction code is a second graphic transaction code.

4. The method of claim 1 further comprising registering, by the transaction server, at least a user of the seller terminal and a user of the mobile terminal in the transaction server.

5. The method of claim 1 further comprising:
establishing a wireless data connection, by a data transmission device of the transaction server, from the transaction server to the mobile terminal;

automatically registering, by the mobile terminal, the user of the mobile terminal; and automatically transmitting, from the mobile terminal to the transaction server, user contact data.

* * * * *

UNITED STATES PATENT AND TRADEMARK OFFICE
CERTIFICATE OF CORRECTION

PATENT NO.         : 10,032,155 B2
APPLICATION NO.    : 14/357105
DATED              : July 24, 2018
INVENTOR(S)        : Dirk Hagemann et al.

Page 1 of 1

It is certified that error appears in the above-identified patent and that said Letters Patent is hereby corrected as shown below:

In the Claims

Column 24, Line 42, Claim 1 reads "sever" should read --server--

Signed and Sealed this
Fourth Day of September, 2018

Andrei Iancu
*Director of the United States Patent and Trademark Office*